US010567661B2

(12) United States Patent
Kim

(10) Patent No.: US 10,567,661 B2
(45) Date of Patent: Feb. 18, 2020

(54) ELECTRONIC APPARATUS AND CONTROLLING METHOD THEREOF

(71) Applicant: SAMSUNG ELECTRONICS CO., LTD., Suwon-si, Gyeonggi-do (KR)

(72) Inventor: Jin-su Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/877,714

(22) Filed: Jan. 23, 2018

(65) Prior Publication Data

US 2018/0213158 A1 Jul. 26, 2018

(30) Foreign Application Priority Data

Jan. 26, 2017 (KR) ........................ 10-2017-0012661

(51) Int. Cl.
H04N 5/232 (2006.01)
G06F 3/0484 (2013.01)
(52) U.S. Cl.
CPC ..... H04N 5/23293 (2013.01); G06F 3/04845 (2013.01); H04N 5/23216 (2013.01)
(58) Field of Classification Search
CPC ................................................ H04N 5/23293
USPC ....................... 348/333.01, 333.02
See application file for complete search history.

(56) References Cited

U.S. PATENT DOCUMENTS

| 8,904,473 | B2 | 12/2014 | Sambamurthy et al. | |
| 9,189,697 | B1 * | 11/2015 | Daniel | G06K 9/2018 |
| 2004/0061676 | A1 * | 4/2004 | Sitrick | G03B 21/26 345/90 |
| 2004/0247120 | A1 | 12/2004 | Yu et al. | |
| 2008/0092244 | A1 | 4/2008 | Lee | |
| 2008/0220715 | A1 | 9/2008 | Sinha et al. | |
| 2009/0268942 | A1 | 10/2009 | Price | |
| 2013/0254011 | A1 * | 9/2013 | Brooke | G06Q 30/0272 705/14.35 |
| 2015/0312467 | A1 | 10/2015 | Lee | |
| 2016/0210473 | A1 * | 7/2016 | Cohen | G06F 3/013 |
| 2016/0219438 | A1 * | 7/2016 | Ward | H04W 12/08 |
| 2016/0224957 | A1 | 8/2016 | Keohane et al. | |
| 2016/0253508 | A1 * | 9/2016 | Song | G06F 21/554 726/29 |

(Continued)

FOREIGN PATENT DOCUMENTS

| EP | 2 541 321 | 1/2013 |
| JP | 4310635 | 8/2009 |
| JP | 2011-150456 | 8/2011 |

(Continued)

OTHER PUBLICATIONS

Search Report dated May 17, 2018 in counterpart International Patent Application No. PCT/KR2018/001090.

(Continued)

Primary Examiner — Anthony J Daniels
(74) Attorney, Agent, or Firm — Nixon & Vanderhye P.C.

(57) ABSTRACT

An electronic apparatus which prevents and/or reduces photographing of contents is provided. The electronic apparatus includes a camera and a processor configured to cause the electronic apparatus to turn off the display and/or control a display to display a UI for restricting photographing of the content in response to a predetermined object being detected in an image received by the camera.

12 Claims, 15 Drawing Sheets

(56) References Cited

U.S. PATENT DOCUMENTS

2018/0286321 A1* 10/2018 Gao .................. G09G 3/34

FOREIGN PATENT DOCUMENTS

| KR | 10-2006-0109544 | 10/2006 |
| KR | 10-2014-0011523 | 1/2014 |
| KR | 10-2015-0100296 | 9/2015 |
| KR | 10-1573887 | 12/2015 |
| KR | 10-2016-0019723 | 2/2016 |
| KR | 10-1644864 | 8/2016 |

OTHER PUBLICATIONS

Written Opinion dated May 17, 2018 in counterpart International Patent Application No. PCT/KR2018/001090.
Extended European Search Report dated Oct. 25, 2019 for EP Application No. 18745155.4.

* cited by examiner

ELECTRONIC APPARATUS AND
CONTROLLING METHOD THEREOF

CROSS-REFERENCE TO RELATED
APPLICATION

This application is based on and claims priority under 35 U.S.C. § 119 to Korean Patent Application No. 10-2017-0012661, filed on Jan. 26, 2017, in the Korean Intellectual Property Office, the disclosure of which is incorporated by reference herein in its entirety.

BACKGROUND

1. Field

The disclosure relates generally to an electronic apparatus and a controlling method thereof, and for example, to an electronic apparatus which displays contents and a controlling method thereof.

2. Description of Related Art

With the recent development of electronic technology, users can exchange various contents through electronic devices and receive contents through electronic devices.

In this process, various methods such as watermark and DRM have been developed to protect contents.

However, these methods have a problem in that it is not possible to prevent another device from photographing photos and moving images displayed on the electronic devices and leaking them to the outside.

SUMMARY

An example aspect of the disclosure relates to an electronic apparatus which may prevent and/or reduce unauthorized photographing of content displayed on the electronic apparatus through another device and a controlling method thereof.

According to an example embodiment, an electronic apparatus which prevents and/or reduces photographing of a content is provided, the electronic apparatus, including a camera, a display configured to display the content, and a processor configured to turn off the display or control the display to display a UI for restricting photographing of the content, in response to a predetermined object being detected in an image received by the camera.

The camera, in response to the display being disposed on a front side of the electronic apparatus, may photograph an image in a front direction of the electronic apparatus.

The processor, in response to the content being displayed in a protection mode, may photograph an image by turning on the camera.

The processor, in response to a predetermined application being executed and the content being displayed on the application, may photograph an image by turning on the camera.

The processor, in response to a content protection function being set on the content, may photograph an image by turning on the camera.

The processor may display a UI for restricting photographing the content to be overlapped with the content or remove the content and display the UI.

The UI for restricting photographing of the content may include at least one of a UI for warning photographing of the content and the content which is blurred.

The processor, in response to an object in a shape of a camera, a camera lens or a human trying to perform photographing being detected on the photographed image, may turn off the display or control the display to display a UI for restricting photographing.

According to an example embodiment, a controlling method of an electronic apparatus which prevents and/or reduces photographing of contents using a camera, is provided, the method including displaying the content and turning off the display or displaying a UI for restricting photographing of the content in response to a predetermined object being detected in an image received by the camera.

The camera, in response to the display being disposed on a front side of the electronic apparatus, may photograph an image in a front direction of the electronic apparatus.

The method may further include, in response to the content being displayed in a protection mode, photographing an image by turning on the camera.

The method may further include, in response to a predetermined application being executed and the content being displayed on the application, photographing an image by turning on the camera.

The method may further include, in response to a content protection function being set on the content, photographing an image by turning on the camera.

The displaying may include displaying a UI for restricting photographing the content to be overlapped with the content or removing the content and displaying the UI.

The UI for restricting photographing of the content may include at least one of a UI for warning photographing of the content and the content which is blurred.

The displaying may include, in response to an object in a shape of a camera, a camera lens or a human trying to perform photographing being detected on the photographed image, turning off the display or displaying a UI for restricting photographing.

According to the above-described various example embodiments, it is possible to prevent and/or reduce the possibility of another device from photographing a content displayed on the electronic apparatus, thereby preventing and/or reducing the possibility of the content from being leaked without authorization.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
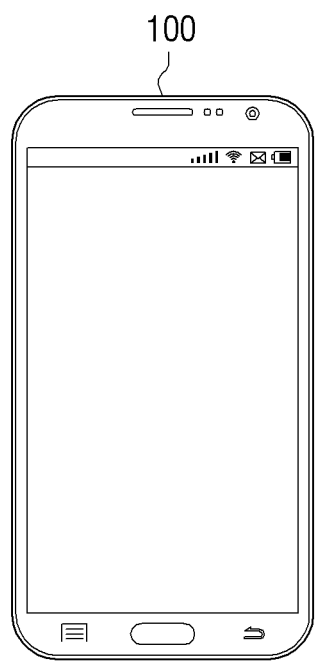
FIG. 1 is a diagram illustrating an example electronic apparatus according to an example embodiment.

Example embodiments may have a variety of modifications and several embodiments. Accordingly, specific example embodiments will be illustrated in the drawings and described in detail in the detailed description. However, this does not necessarily limit the scope of the example embodiments to a specific embodiment form. Instead, modifications, equivalents and replacements included in the disclosure and technical scope of this disclosure may be employed. While describing example embodiments, if it is determined that the specific description regarding a known technology obscures the gist of the disclosure, the specific description may be omitted.

The terms such as "first," "second," and so on may be used to describe a variety of elements, but the elements should not be limited by these terms. The terms used herein are solely intended to explain specific example embodiments, and not to limit the scope of the present disclosure.

The terms used herein are solely intended to explain a specific example embodiment, and not to limit the scope of the present disclosure. Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In an example embodiment, 'a module' or 'a unit' performs at least one function or operation, and may be hardware, such as a processor or integrated circuit, software that is executed by a processor, or any combination thereof. In addition, a plurality of 'modules' or a plurality of 'units' may be integrated into at least one module and include at least one processor except for 'modules' or 'units' that should be realized in a specific hardware.

Hereinafter, various example embodiments will be described in greater detail with reference to accompanying drawings.

FIG. 1 is a diagram illustrating an example structure of a display apparatus according to an example embodiment.

As illustrated in FIG. 1, the electronic apparatus 100 may provide an intelligent assistant service alone. However, this is only an example, and the electronic apparatus 100 may be implemented as various types of devices which may display contents, such as, for example, and without limitation, TV, tablet PC, PDA, e-album, and navigation device, and a wearable device such as a smart watch, or the like.

The electronic apparatus 100 may detect whether the content displayed on the electronic apparatus 100 is photographed or whether there is an attempt to photograph the content from outside. In other words, the electronic apparatus 100 may detect an attempt to photograph the content displayed on the electronic apparatus 100.

If there is a photographing attempt, the electronic apparatus 100 may control the electronic apparatus 100 to prevent and/or obscure or restrict the photographing of the content.

For example, in an example case where an external camera (see, e.g., FIG. 3A) is facing a display of the electronic apparatus 100 while the electronic apparatus displays a movie on the display of the electronic apparatus 200.

In this case, the electronic apparatus 100 may turn off (or deactivate) the display where the movie has been displayed, display a warning message for restricting photographing on the display, or blur the movie, or the like, but is not limited thereto.

Accordingly, the electronic apparatus 100 may prevent and/or reduce the content displayed on the electronic apparatus 100 from being photographed from outside.

Figure 2:
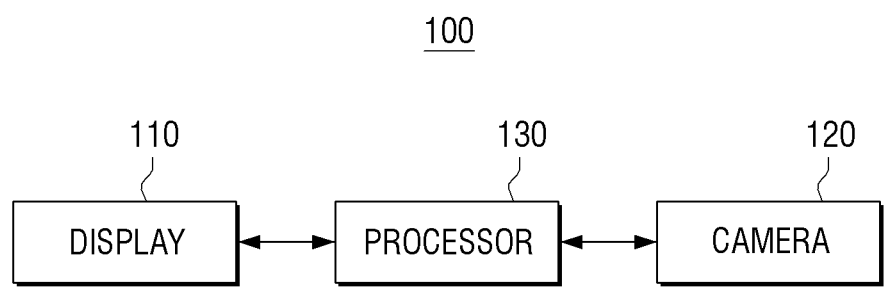
FIG. 2 is a block diagram illustrating an example configuration of an electronic apparatus according to an example embodiment.

FIG. 2 is a block diagram illustrating an example configuration of an electronic apparatus according to an example embodiment.

Referring to FIG. 2, the electronic apparatus 100 includes a camera 120, a display 110 and a processor (e.g., including processing circuitry) 130.

The display 110 may display an image. Here, the content may include a still image such as photo, document, web page, broadcast program, movie and a moving image, or the like, but is not limited thereto.

The display may be disposed on one side of the electronic apparatus 100. For example, the display 110 may be disposed on a front side (that is, a front side of the body of the electronic apparatus 100) of the electronic apparatus 100.

In this case, the display 110 may be implemented as various types of displays, such as, for example, and without limitation, a Liquid Crystal Display (LCD), or the like.

The camera 120 photographs an image (receives an image). To do so, the camera 120 may include various image capturing circuitry, such as, for example, and without limitation, an image sensor (not shown), a lens (not shown) and a flash (not shown), or the like, and may process an image frame such as a still image or a moving image which is obtained by the image sensor.

In this case, the camera 120 may photograph (receive) an image in the front direction of the electronic apparatus 100. Here, the display 110 is disposed on the front of the electronic apparatus 100 and thus, the front direction may be the front direction of the display 110 with reference to the display 110.

In other words, the lens of the camera 120 may be disposed to face the front side of the display 110 to photograph (receive an image of) an object present on the front side of the display 110.

Meanwhile, the camera 120 may be built in the electronic apparatus 100 or may be separated from the electronic apparatus 100.

If the camera 120 is built in the electronic apparatus 100, the camera 120 may be disposed on the same surface as the display 110 in the electronic apparatus 100. For example, the camera 120 may be disposed on the front side (that is, the front side of the body of the electronic apparatus 100) of the electronic apparatus 100.

The processor 130 may include various processing circuitry and controls the overall operation of the electronic apparatus 100.

For example, the processor 130 may control the display 110 to display contents.

Here, the contents may be received from outside. For example, the contents may be received from an external electronic apparatus, a server, a broadcasting station, or the like, but is not limited thereto.

Here, the processor 130 may receive contents from outside and display the received contents on the display 110.

Figure 3A:
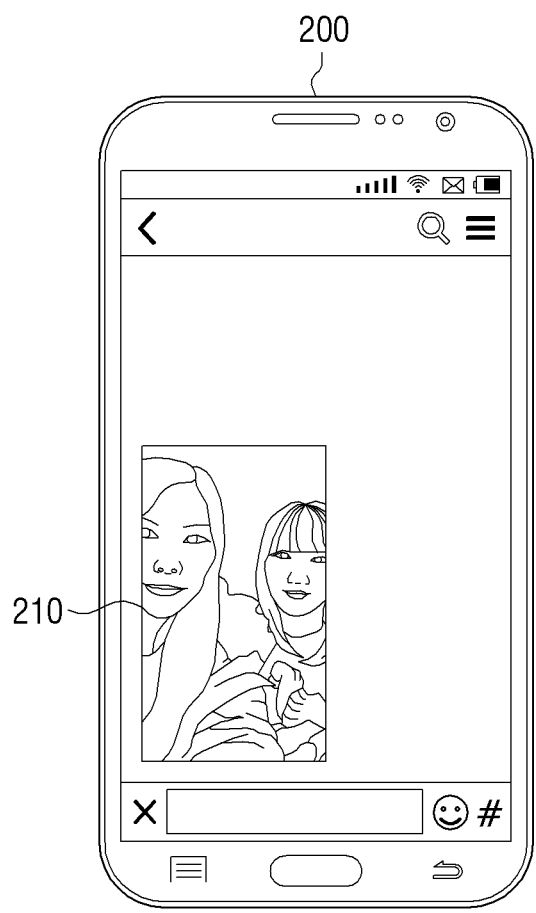
FIGS. 3A, 3B and 3C are diagrams illustrating an example method of displaying a content according to an example embodiment.

For example, as illustrated in FIG. 3A, the external electronic apparatus 200 may upload a photo 210 onto a server (not shown) through a message application in order to transmit the photo 210 to the electronic apparatus 100 through the message application.

Figure 3B:
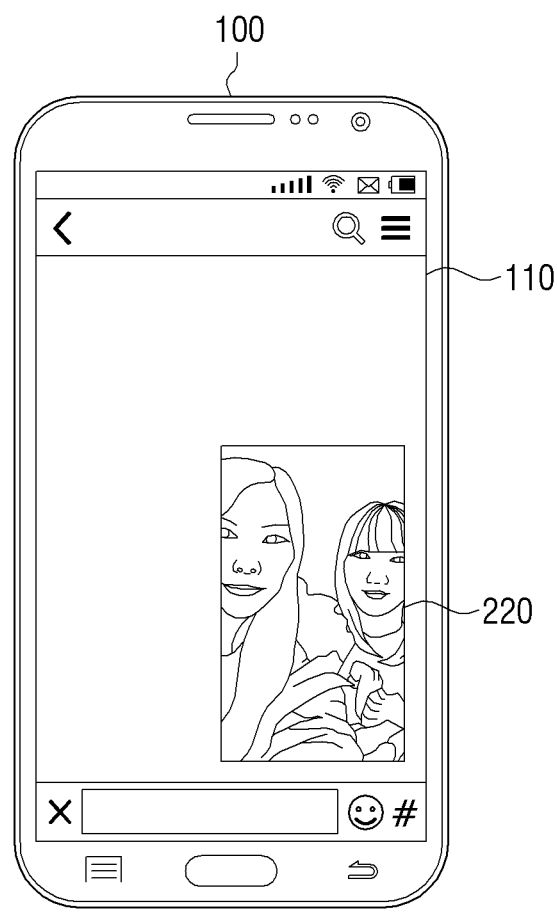
Figure 3C:
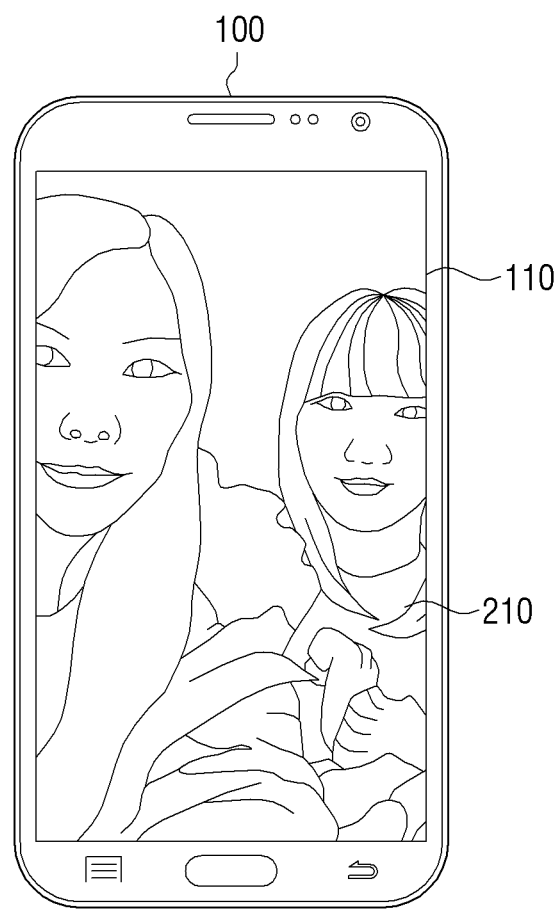

In this case, as illustrated in FIG. 3B, the processor 130 may execute the message application according to a user command, receive a thumbnail image 220 of the photo 210 from the server (not shown) through the message application and display the thumbnail image 220 on the display 110. Subsequently, when the thumbnail image 220 is selected, as illustrated in FIG. 3C, the processor 130 may receive the photo 210 from the server (not shown) and display the received photo 210 on the display 110.

Meanwhile, the above example embodiment describes that the electronic apparatus 100 displays contents through the message application, but this is only an example and the disclosure is not limited thereto.

In other words, when contents are received, the processor 130 may execute the message application according to a user input, receive the contents through the message application, and store the contents in the electronic apparatus 100. Subsequently, the processor 130 may execute a multimedia application according to a user input and display the contents stored in the electronic apparatus 100 on the display 110.

For example, the processor 130 may execute a video application and display a moving image by playing the moving image stored in the electronic apparatus 100 on the display 110 through the video application. In another example, the processor 130 may execute a photo application and display a photo stored in the electronic apparatus 100 on the display 110 through the photo application.

The above example embodiment describes that the electronic apparatus 100 receives contents through the message application, but this is only an example.

In other words, the electronic apparatus 100 may, for example, and without limitation, be connected to an external electronic apparatus (not shown) using a nearfield communication method such as WiFi, Bluetooth, or the like, to receive contents from the external electronic apparatus (not shown) and display the received contents on the display 110.

The electronic apparatus 100 may, for example, and without limitation, connect to a server (not shown) through an Internet application (that is, a web browser), receive contents from the server (not shown) and display the received contents on the display 110.

In addition, the electronic apparatus 100 may, for example, and without limitation, receive contents (that is, broadcast programs) provided through a terrestrial wave, a cable, an IPTV, a satellite broadcast from a broadcasting station or a broadcasting company, or the like, and display the received contents on the display 110.

As such, the electronic apparatus 100 may receive contents from outside in various ways and display the contents.

Meanwhile, the above example embodiment describes that contents are received from outside, but this is only an example. The contents may be generated from the electronic apparatus 100.

For example, the contents may include a still image or a moving image which is generated by a camera (not shown) disposed on the front or rear side of the electronic apparatus 100 which photographs images.

Meanwhile, the processor 130 may detect a predetermined object in an image photographed through the camera 120.

In other words, when contents are displayed on the display 110, the processor 130 may photograph the front side of the display 110 by turning on (e.g., activating) the camera 120 and detect a predetermined object from the photographed (received) image.

Here, the predetermined object may include an electronic apparatus (for example, and without limitation, a mobile phone including a camera or a camera function, a tablet PC, a PDA, a wearable device, etc.), a camera lens, a person who performs photographing, or the like.

When a predetermined object is detected from the image photographed (received) through the camera 120, the processor 130 may control the electronic apparatus 100 to prevent and/or reduce photographing of the contents displayed on the display 110. As used herein, throughout the disclosure, when reference is made to analyzing or detecting an object in an image photographed through the camera, it will be understood that this may refer, for example, and without limitation, to analyzing or detecting an object present in image data received through the camera to determine whether to control the electronic apparatus to restrict the contents displayed on the display from being photographed.

In other words, if a predetermined object is detected from the image photographed through the camera 120, it can be considered that there is an attempt to photograph the contents displayed on the display 110 and thus, the processor 130 may control the electronic apparatus 100 to prevent and/or reduce the contents displayed on the display 110 from being photographed.

As such, the function of preventing and/or reducing photographing of the contents displayed on the display 110 by detecting whether the contents displayed on the display 110 have been photographed or there is an attempt to photograph the contents displayed on the display 110 from outside may be referred to, for example, as a content protection function.

Meanwhile, according to various example embodiments, when the contents are displayed on the display 110, the processor 130 may perform the content protection function by turning on the camera 120. Various methods of performing the content protection function will be described in greater detail below.

According to an example, the electronic apparatus 100 may have two modes. One is a general mode in which the content protection function is not performed, and the other is a mode in which the content protection function is performed. Conversion between the modes can be performed, for example, through a mode conversion command input from a user.

In this case, when contents are displayed on the display 110 in the protection mode, the processor 130 may photograph an image by turning on the camera 120.

For example, the processor 130 checks the mode of the electronic apparatus 100, and if contents are displayed on the display 110 in the protection mode, the processor 130 may turn on the camera 120 and photograph the front side of the display 110. On the other hand, when contents are displayed on the display 110, the processor 130 may check the mode of the electronic apparatus 100, and if the mode of the electronic apparatus 100 is the protection mode, the processor 130 may turn on the camera 120 and photograph an image in the front of the display 110.

According to another example, if a predetermined application is executed and contents are displayed on the application, the processor 130 may turn on the camera 120 and photograph an image.

For example, the predetermined application may be an application in which the content protection function is set. In this case, the content protection function may be set and provided in the application by a manufacturer in advance, or may be set and changed by a user.

For example, when an application is executed, the processor 130 may confirm whether the content protection function is set in the application. If the content protection function is set in the application and contents are displayed on the display 110 through the corresponding application, the processor 130 may turn on the camera 120 and photograph an image in the front side of the display 110. In addition, if an application is executed and contents are displayed on the display 110 through the executed application, the processor 130 may confirm whether the content protection function is set in the corresponding application. If the content protection function is set in the corresponding application, the processor 130 may turn on the camera 120 and photograph an image in the front side of the display 110.

For example, in an example case in which the content protection function is set is a message application. In this case, when the message application is executed and contents are displayed on the display 110 through the message application, the processor 130 may turn on the camera 120 and photograph an image.

According to another example, if the content protection function is set in contents, the processor 130 may turn on the camera 120 and photograph an image.

This is the case in which the content protection function is set the contents themselves, and information regarding whether the content protection function is set can be included in the metadata of the contents.

For example, if an application is executed and contents are displayed on the display 110 through the executed application, the processor 130 may confirm whether the content protection function is set in the contents based on the metadata of the corresponding contents. If the content protection function is set in the contents, the processor 130 may turn on the camera 120 and photograph an image in the front of the display 110.

Here, the content protection function may be set at the time when the contents are generated or after the contents are generated.

Figure 4:
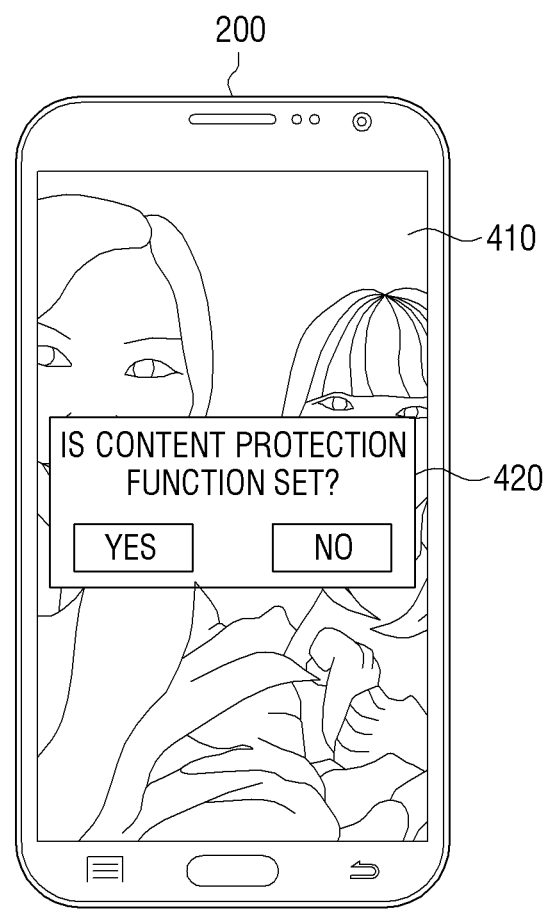
FIG. 4 is a diagram illustrating an example method of setting a content protection function according to an example embodiment.

For example, if the external electronic apparatus 200 takes a photo 410, as illustrated in FIG. 4, the external electronic apparatus 200 may display a UI 420 to ask whether to set the content protection function in the photo. Accordingly, if a user input to set the content protection function is received through the UI 420, the external electronic apparatus 200 may set the content protection function in the photo 410. In this case, information that the content protection function has been set can be included in the metadata of the photo 410.

Meanwhile, in the above examples, the processor 130 may determine whether the contents displayed on the display 110 is the type of contents subject to content protection based on the file type.

For example, if the contents displayed on the display 110 are image files having a file extension such as, for example, and without limitation, jpg, jpeg, gif, bmp, tiff, png, or the like, the processor 130 may determine that the contents displayed on the display 110 correspond to still images where the content protection function is applied.

In another example, if the contents displayed on the display 110 are image files having a file extension such as, for example, and without limitation, mpeg, mpg, mp4, avi, mov, mkv, or the like, the processor 130 may determine that the contents displayed on the display 110 correspond to moving images where the content protection function is applied.

Accordingly, when the contents where the content protection function is applied are displayed on the display 110, the processor 130 may turn on the camera 120 and photograph an image.

Meanwhile, the processor 130 may detect a predetermined object from a photographed image.

Here, the predetermined object may include an electronic apparatus capable of performing photographing such as, for example, and without limitation, a camera lens, a person who performs photographing, or the like.

To do so, the electronic apparatus 100 may pre-store various information, such as, for example, information regarding the shape of the electronic apparatus, the shape of the camera lens, shape of the person who performs photographing, or the like.

Accordingly, the processor 130 may determine whether there is an object having, for example, the shape of an electronic apparatus, a camera lens, and a person who performs photographing in the image frame photographed through the camera 120 and detect the electronic apparatus, the lens or the person who performs photographing from the image frame.

However, this is only an example, and the electronic apparatus 100 may detect an electronic apparatus, a camera lens or a person who performs photographing from a photographed image frame using various algorithms.

As such, when the contents are displayed on the display 110, the processor 130 may turn on the camera 120 to photograph an image in the front of the display 110 and detect a predetermined object from the photographed image. In this case, the processor 130 may keep photographing an image in the front of the display 110 through the camera 120 while the contents are displayed on the display 110 and determine whether a predetermined object is present in the front of the display 110 while the contents are displayed on the display 110.

Accordingly, when a predetermined object is detected from the image photographed by the camera 120, the processor 130 may determine that there is an attempt to photograph the contents displayed on the display 110.

However, this is only an example. The processor 130 may detect a photographing attempt regarding the contents displayed on the display 110 using various methods in addition to the method of using the image photographed by the camera 120.

According to an example, the processor 130 may detect a photographing attempt regarding the contents displayed on the display 110 using a flash (not shown) of the camera 120.

In this case, the processor 130 may output light through the flash (not shown) when photographing an image through the camera 120 or may output light through the flash (not shown) even when photographing is not performed through the camera 120.

For example, the processor 130 may output light through the flash (not shown) and receive light reflected from an object to measure reflectivity of the object. To do so, the electronic apparatus 10 may include a light receiving element (not shown) for receiving light.

In addition, the processor 130 may determine whether there is a camera lens in the front of the display 110 based on reflectivity. To do so, the electronic apparatus 100 may pre-store reflectivity information regarding a lens.

In other words, even if the same amount of light is irradiated on the object, the amount of reflected light varies depending on the characteristics of a medium and thus, the object can be distinguished according to the degree of light reflected by the object.

Accordingly, the electronic apparatus 100 may pre-store information regarding the reflectivity of the camera lens when the camera lens exists at a predetermined distance from the front side of the display 110, and determine whether an object having reflectivity measured by reflective light corresponds to the camera lens using the pre-stored information.

If the object which exists in the front of the display 110 corresponds to the camera lens, the processor 130 may determine that there is an attempt to photograph the contents displayed on the display 110.

According to another example, the processor 130 may detect a photographing attempt regarding the contents displayed on the display 110 using an infrared sensor (not shown) of the electronic apparatus 100.

For example, the processor 130 may sense the ambient illuminance of the electronic apparatus 100, and if the detected illuminance value is equal to or less than a predetermined value, may photograph an image in the front of the display 110 through the infrared sensor (not shown). If a predetermined object is detected from the photographed image, the processor 130 may determine that there is a photographing attempt regarding the contents displayed on the display 110.

In other words, when the periphery of the electronic apparatus 100 is dark, an object may not be recognized clearly in the image photographed through the camera 120. Accordingly, when the periphery of the electronic apparatus 100 is dark, the processor 130 may detect a photographing attempt regarding the contents displayed on the display 110 using the infrared sensor (not shown).

According to another example, the processor 130 may detect a photographing attempt regarding the contents displayed on the display 110 using a thermal sensor (not shown) of the electronic apparatus 100.

In other words, the processor 130 may determine whether the shape of a person corresponding to the body temperature of the person sensed through the thermal sensor (not shown) is the shape of the person who performs photographing, and if it is determined that the sensed shape of person corresponds to the shape of the person who performs photographing, may determine that there is an attempt to photograph the contents displayed on the display 110.

According to another example, if the camera 120 is covered by another object, the processor 130 may determine that there is an attempt to photograph the contents displayed on the display 110.

To do so, the electronic apparatus 100 may include an illuminance sensor (not shown) located in the lens (not shown) of the camera 120. Accordingly, if the illuminance value sensed based on the illuminance value sensed by the illuminance sensor (not shown) is less than a predetermined value while contents are displayed on the display 110, the processor 130 may determine that the lens (not shown) of the camera 120 is covered.

However, this is only an example, and the processor 130 may determine whether the camera 120 is covered by another object in various ways. For example, the processor 130 may analyze an image photographed by the camera 120, and if a black screen appears continuously in the photographed image, the processor 130 may determine that the lens (not shown) of the camera 120 is covered.

As such, the processor 130 may detect a photographing attempt in various ways.

Meanwhile, in the above examples, the processor 130 may consider the distance between an object and the display 110 when determining whether there is a photographing attempt.

In other words, if the contents displayed on the display 110 are photographed from a location away from the display 110 by a certain distance, the contents cannot be photographed clearly due to the distance.

Accordingly, even if a predetermined object is detected in the front of the display 110, the processor 130 may determine that there is a photographing attempt only when the predetermined object exists within a certain distance from the display 110. To do so, the electronic apparatus 100 may include a laser sensor (not shown) to measure a distance from an object.

As such, the processor 130 may detect a photographing attempt in various ways.

Meanwhile, if a predetermined object is detected in an image photographed through the camera 120, the processor 130 may turn off the display 110 or control the display 110 to display a UI for restricting photographing of contents.

In other words, if an object in the shape of camera, camera lens or person who attempts to perform photographing is detected in the photographed image, the processor 130 may turn off the display 110 or control the display 110 to display a UI for restricting photographing.

When a photographing attempt is detected, the processor 130 may turn off the display 110.

Figure 5A:
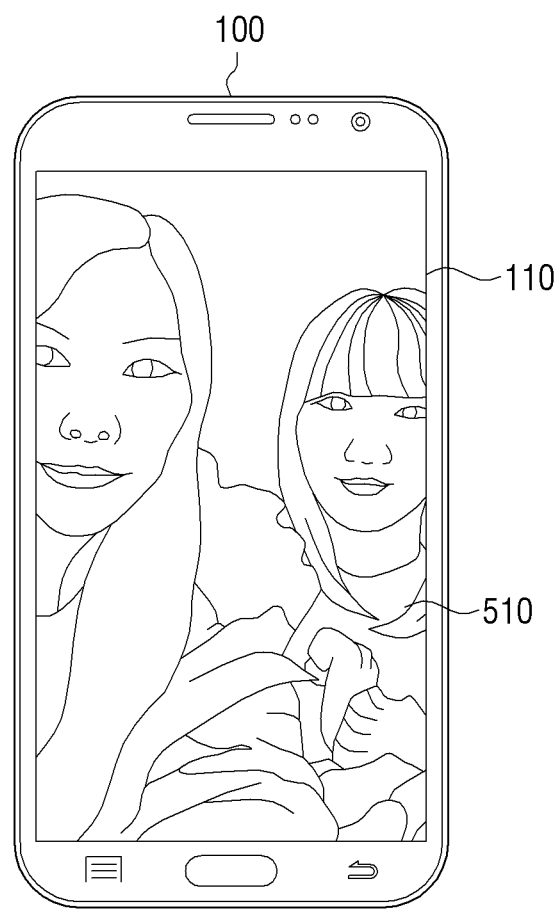
FIGS. 5A, 5B, 6A, 6B, 6C, 7A and 7B are diagrams illustrating an example method of preventing and/or reducing content photographing according to an example embodiment.
Figure 5B:
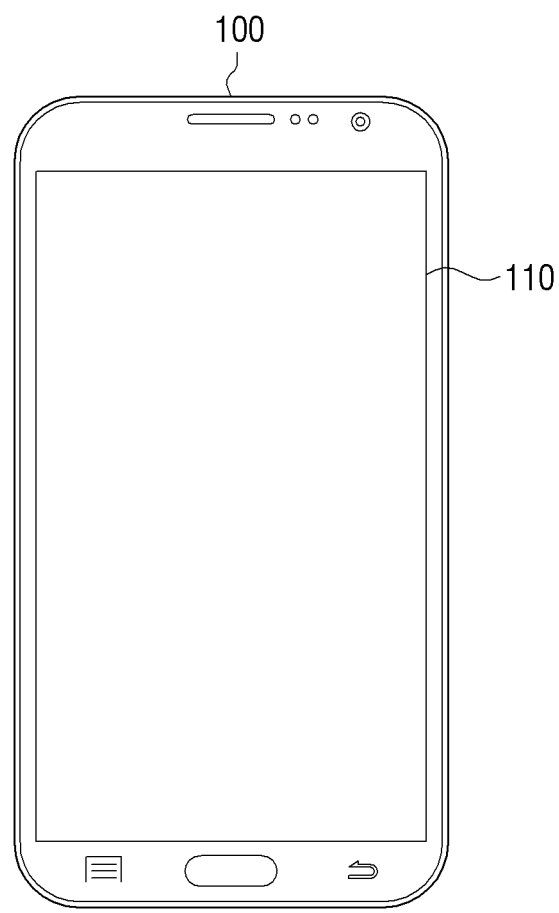

For example, as illustrated in FIG. 5A, an example case in which a photographing attempt is detected while a photo 510 is displayed on the display 110. In this case, as illustrated in FIG. 5B, the processor 130 may turn off the display 110. Accordingly, the photo 510 is not displayed on the display 110 any longer.

In this case, the processor 130 may, for example, turn off a light emitting element for outputting a screen on the display 110 in order to turn off the display 110.

For example, if the display 110 is implemented as an LCD panel (not shown) and a backlight (not shown) which provides light to an LCD panel (not shown), the processor 130 may turn off the backlight. However, if the display 110 is implemented as an LED panel or an OLED panel which includes a self-luminous element such as a light emitting diode (LED) or an organic light emitting diode (OLED), the processor 130 may turn off the LED or the OLED.

In addition, the processor 130 may control the display 110 to display a UI for restricting photographing of a content.

Here, the UI for restricting photographing of a content may include a UI for warning photographing of a content.

In this case, the processor 130 may display a UI for restricting photographing of a content to be overlaid with the content.

Figure 6A:
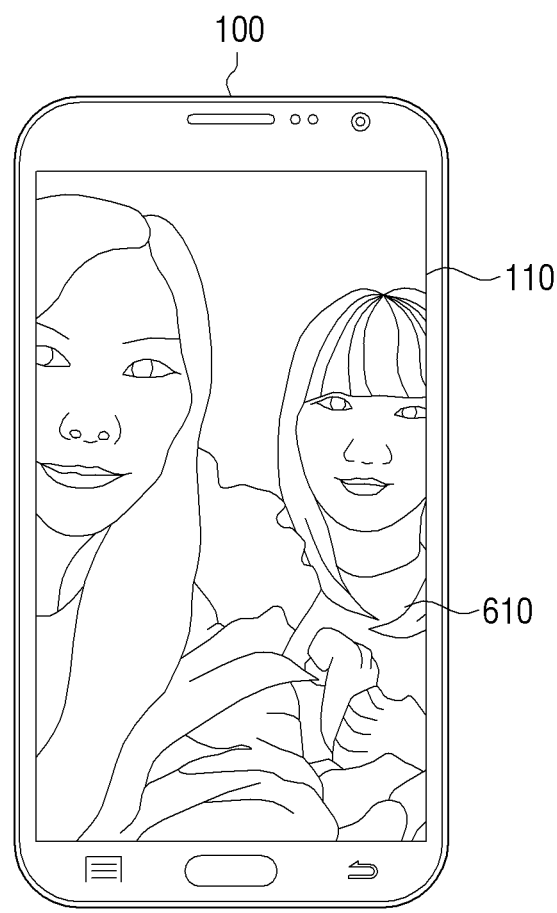
Figure 6B:
Figure 6C:
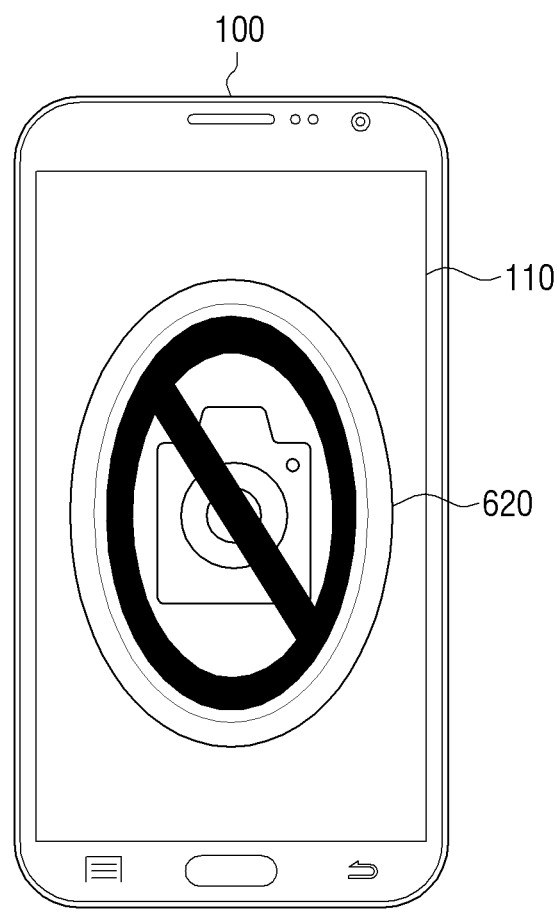

For example, in an example case in which an attempt to perform photographing is detected while a photo 610 is displayed on the display 110 is illustrated in FIG. 6A. In this case, a UI 620 for warning photographing of the content may be displayed to be overlaid with the photo 610 as illustrated in FIG. 6B. Here, the UI 620 may have a size large enough to cover most of the photo 610.

As another example, the processor 130 may display a UI for restricting photographing of the content after removing the content.

For example, in an example case in which an attempt to perform photographing is detected while a photo 610 is displayed on the display 110 as illustrated in FIG. 6A. In this case, the processor 130 may display the UI 620 for warning photographing of a content on the display 110 without the photo 610 on the display 110.

In addition, the UI for restricting photographing of a content may include a blurred content.

In other words, if a photographing attempt is detected, the processor 130 may blur the content displayed on the display 110 and display the blurred content on the display 110.

Figure 7A:
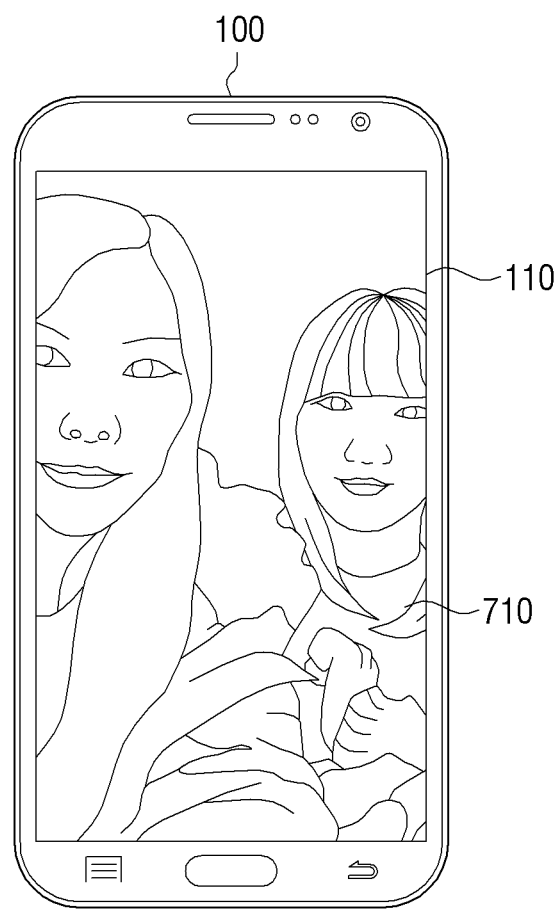
Figure 7B:
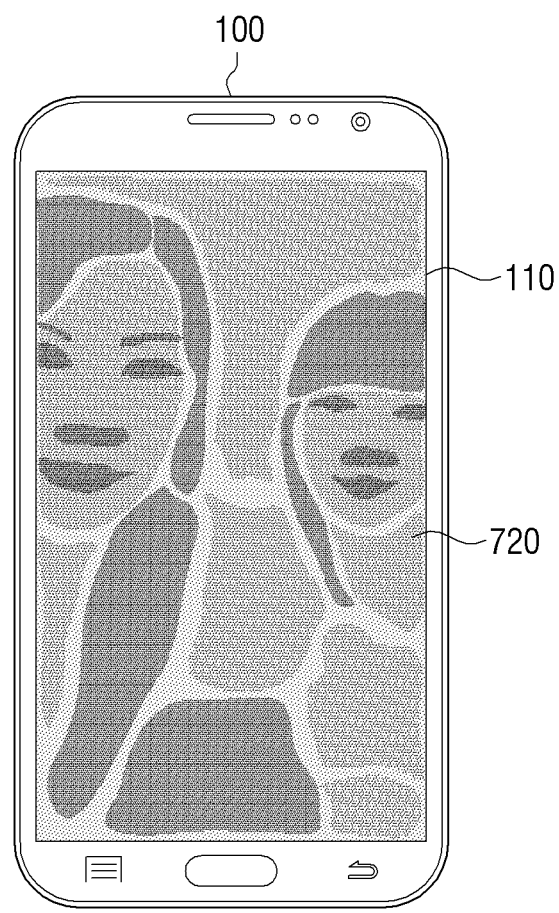

For example, an example case in which an attempt to perform photographing is detected while a photo 710 is displayed on the display 110 is illustrated in FIG. 7A. In this case, the processor 130 may blur the photo and display the blurred photo 720 on the display 110 as illustrated in FIG. 7B.

As such, according to various examples, when a photographing attempt is detected, the photographing of contents may be prevented and/or reduced in various ways. Accordingly, it is possible to prevent and/or reduce leakage of the contents without authorization.

Figure 8:
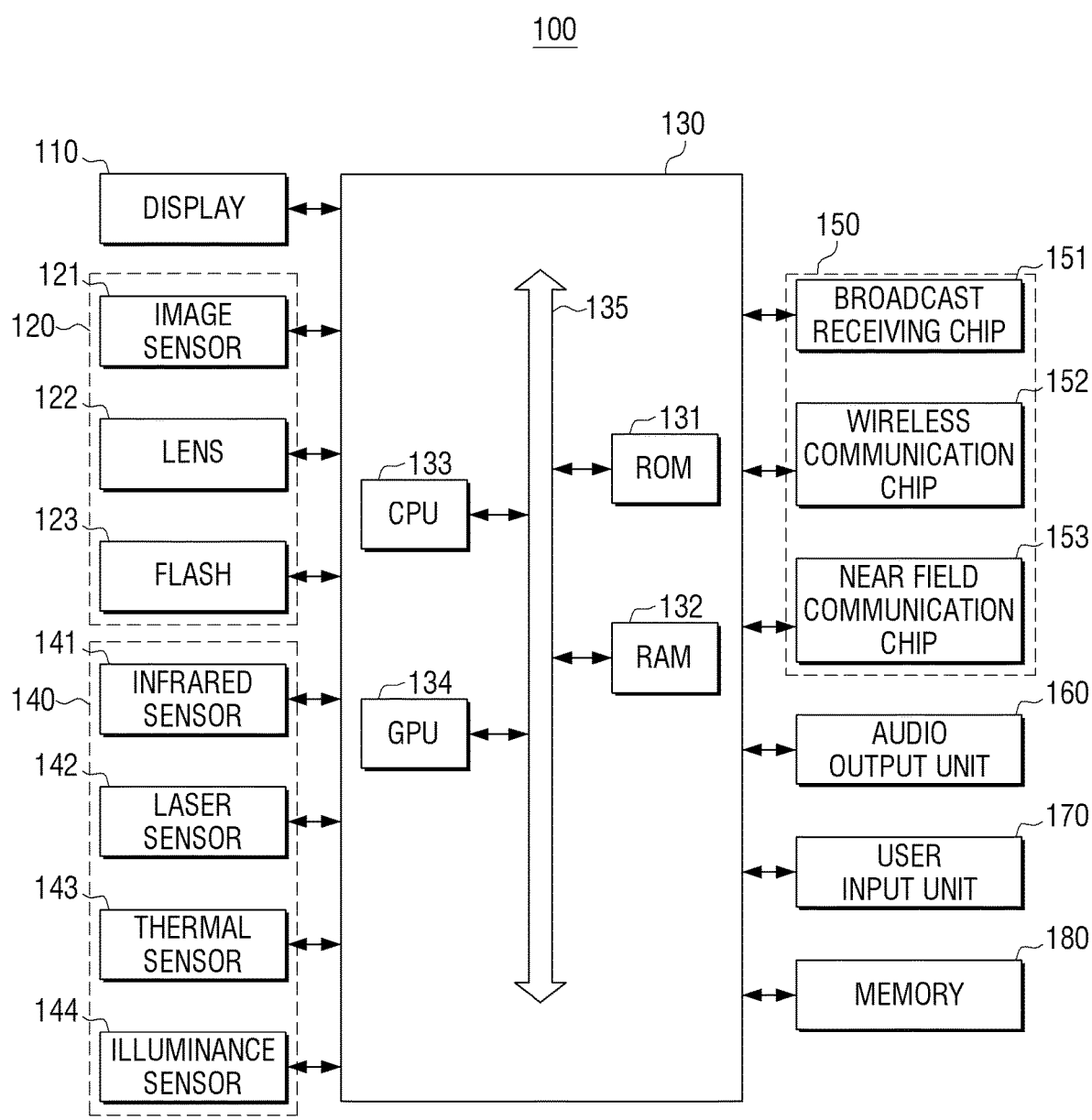
FIG. 8 is a block diagram illustrating an example configuration of an electronic apparatus according to an example embodiment.

FIG. 8 is a block diagram illustrating an example configuration of an electronic apparatus according to an example embodiment.

Referring to FIG. 8, the electronic apparatus 100 includes the display 110, the camera 120, the processor (e.g., including processing circuitry) 130, a sensor 140, a communicator (e.g., including communication circuitry) 150, an audio output unit (e.g., including audio output circuitry) 160, a user input unit (e.g., including input circuitry) 170, and a memory 180.

Meanwhile, elements of the electronic apparatus 100 in FIG. 8 are merely examples, and are not necessarily limited to the elements in FIG. 8. Accordingly, one or more of the elements of the electronic apparatus 10 illustrated in FIG. 8 may be omitted or modified, or one or more elements may be added to the electronic apparatus 100.

As the features of the display 110, the camera 120 and the processor 130 have been described with regard to FIG. 2, further description will not be repeated here.

The display 110 may be implemented as a touch screen in a layer structure in combination with a touch panel (not shown). The touch screen may have not only a display function, but also a function to detect a touch input position, a size of the touched area and a touch input pressure. Further, the touch screen may have a function to detect a proximity touch as well as a real touch.

Accordingly, the display 110 may provide an input interface between the electronic apparatus 100 and a user and at the same time, an output interface between the electronic apparatus 100 and a user.

The camera 120 photographs an image. To do so, the camera 120 may include, for example, and without limitation, an image sensor 121, a lens 122 and a flash 123, or the like. Meanwhile, although not illustrated in the drawings, the electronic apparatus 100 may further include a camera (not shown) which is disposed on the rear surface (that is, the rear surface of the main body of the electronic apparatus 100) of the electronic apparatus 100.

The sensor 140 may include one or more sensors to sense at least one of information of the electronic apparatus 100, peripheral environment information of the electronic apparatus 100 and user information.

For example, the sensor 140 may, for example, and without limitation, include an infrared sensor (IR sensor) 141, a laser sensor 142, a thermal sensor 143, and illumination sensor 144, or the like. In this case, the processor 130 may utilize information sensed by such sensors.

The communicator 150 may include various communication circuitry and communicate with various types of external devices according to various manners of communication.

For example, the communicator 150 may, for example, and without limitation, include one or more modules which enable wireless communication between the electronic apparatus 100 and a wireless communication system, the electronic apparatus 100 and another electronic apparatus 100, or the electronic apparatus 100 and an external server. In addition, the wireless communicator 150 may include one or more modules which connect the mobile terminal 100 to one or more networks.

For example, the communicator 150 may include, for example, and without limitation, at least one of a broadcast receiving chip 151, a wireless communication chip 152 and a near field communication chip 153, or the like. The processor 130 may perform communication with an external server or other various types of external devices using the communicator 150.

The audio output unit 160 may include various audio output circuitry and outputs not only various audio but also various notice sounds or voice messages. In particular, the audio output unit 160 may be implemented as a speaker, but this is only an example. The audio output unit 160 may, for example, and without limitation, be implemented as an output terminal capable of outputting audio.

In this case, the processor 130 may output audio for warning photographing of contents through the audio output unit 160.

For example, if a photographing attempt is detected while contents are displayed on the display 110, the processor 130 may output a voice, "unauthorized photographing is being attempted. Please check", through the audio output unit 160. In this case, the processor 130 may output a UI for warning photographing of contents along with the voice.

The user input unit 170 may include various input circuitry to receive various user inputs and transfer the same to the processor 130.

In this case, the user input unit 170 may include, various input circuitry, such as, for example, and without limitation, a touch panel (not shown), a (digital) pen sensor (not shown) or a key (not shown), or the like. The touch panel (not shown) may, for example, use at least one of electrostatic type, pressure sensitive type, infrared type, and an ultraviolet type. The touch panel (not shown) may further include a control circuit. The touch panel (not shown) may further include a tactile layer to provide a tactile response to a user. The (digital) pen sensor (not shown), for example, may be part of a touch panel or include a separate detection sheet. The key (not shown), for example, may include a physical button, an optical key, or a keypad.

The processor 130 may include various processing circuitry and controls the overall operation of the electronic apparatus 100. For example, the processor 130 may control hardware or software elements connected to the processor 130 by driving the O/S or an application program, and process or compute various data. Further, the processor 130 may load and process a command or data received from at least one of the other elements in a volatile memory and store diverse data in a non-volatile memory.

For example, the processor 130 may be realized as a generic-purpose processor (for example, a CPU or an application processor) by executing one or more software programs stored in a dedicated processor for performing the corresponding operation (for example, an embedded processor) or a memory device.

Meanwhile, the processor 130 may include, for example, and without limitation, a ROM 131, a RAM 132, a Graphic Processing Unit (GPU) 134, a CPU 133 and a bus 135. The ROM 131, the RAM 132, the GPU 134, and the CPU 133 may be connected with each other through the bus 135.

The CPU 133 may access the memory 180 and perform booting using the O/S stored in the memory 180. The CPU 133 may also perform various operations by using various types of programs, contents, data, and the like stored in the memory 180.

The ROM 131 may store a set of commands for system booting. If a turn-on command is input and thus power is applied, the CPU 133 may copy the OS stored in the memory 180 to the RAM 132 according to the command stored in the ROM 131 and may execute the OS to boot the system. When the booting is completed, the CPU 133 may copy the various programs stored in the memory 180 to the RAM 132, and perform various operations by executing the programs copied to the RAM 132.

Upon completion of the boot-up operation of the electronic apparatus 100, a screen including various objects, such as icons, images, text, or the like can be generated.

The memory 180 may store various programs and data necessary for the operation of the electronic apparatus 100. The memory 180 may store commands or data received from the processor 130 or other elements or generated by the processor 130 or other elements.

In this case, the memory 180 may be implemented as a non-volatile memory, a volatile memory, a flash memory, a hard disk drive (HDD) or a solid state drive (SDD). The memory 180 may be accessed by the processor 130, and perform readout, recording, correction, deletion, update, and the like, on data by the processor 130.

Figure 9:
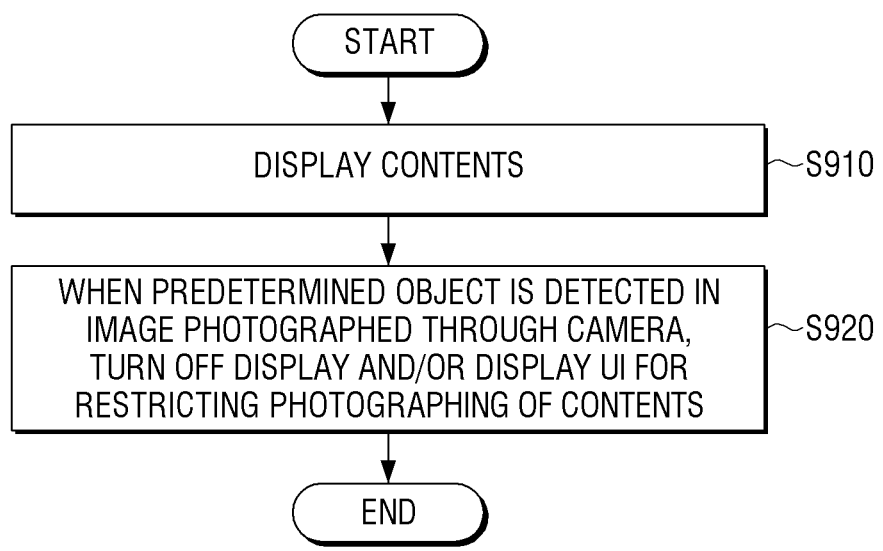
FIG. 9 is a flowchart illustrating an example method of controlling an electronic apparatus according to an example embodiment.

FIG. 9 is a flowchart illustrating an example method of controlling an electronic apparatus according to an example embodiment.

Contents are displayed (S910).

When a predetermined object is detected in an image photographed by a camera, a display to display the contents is turned off, and/or a UI for restricting photographing of the contents is displayed (S920).

Here, if the camera is disposed in the front of the display apparatus, the camera may photograph an image in the front direction of the electronic apparatus.

Meanwhile, if the contents are displayed in a protection mode, the camera may be turned on and an image can be photographed.

Additionally, if a predetermined application is executed and contents are displayed on the application, the camera may be turned on and an image can be photographed.

If a protection function is set for the contents, the camera may be turned on and an image can be photographed.

Meanwhile, in the step of S920, a UI for restricting photographing of contents may be displayed to be overlaid with the contents, or may be displayed after removing contents.

The UI for restricting photographing of contents may include at least one of a UI for warning photographing of contents and blurred contents.

In addition, in the step of S920, if an object in the shape of camera, camera lens or person attempts to perform photographing is detected, the display may be turned off, or a UI for restricting photographing may be displayed.

The above-described method according to various example embodiments may be implemented in a program and provided to display apparatuses. In particular, the program including a method for controlling a display apparatus according to example embodiments may be stored in a non-transitory computer readable medium and provided therein.

The non-transitory readable medium may refer, for example, to a medium that stores data and is capable of being read by a device. In particular, the various applications or programs described above may be stored and provided on non-volatile readable media such as CD, DVD, hard disk, Blu-ray disk, USB, memory card, ROM.

The non-transitory computer readable recording medium refers to a medium that stores data and that can be read by devices. For example, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing example embodiments and advantages are merely examples and are not to be construed as limiting the present disclosure. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An electronic device comprising:
   a camera;
   a display; and
   a processor configured to:
      control the display to display a content,
      in response to a content protection function being set in the content, turn on the camera,
      obtain an image through the turned-on camera, and
      in response to a predetermined object being detected in the image obtained by the camera, control the display to display a UI (user interface) overlapping with the displayed content for restricting photographing of the content.

2. The electronic device as claimed in claim 1, wherein the camera is configured to obtain the image in a front direction of the electronic device in response to the display being disposed on a front side of the electronic device.

3. The electronic device as claimed in claim 1, wherein the processor is configured to cause the electronic device to obtain the image by turning on the camera of the electronic device in response to the content being displayed in a protection mode.

4. The electronic device as claimed in claim 1, wherein the processor is configured to cause the electronic device to obtain the image by turning on the camera in response to a predetermined application being executed and the content being displayed on the application.

5. The electronic device as claimed in claim 1, wherein the UI restricting photographing of the content includes a UI warning photographing of the content.

6. The electronic device as claimed in claim 1, wherein the processor is configured to control the display to display the UI restricting photographing, in response to an object in a shape of one or more of a camera, a camera lens or a human trying to perform photographing being detected on the obtained image.

7. A method of controlling an electronic device, the method comprising:
   displaying a content on a display of the electronic device;

in response to a content protection function being set in the content, turning on a camera of the electronic device;

obtaining an image through the turned-on camera; and in response to a predetermined object being detected in the image obtained by the camera of the electronic device, displaying a UI overlapping with the displayed content for restricting photographing of the content.

8. The method as claimed in claim 7, wherein the obtaining comprises obtaining the image in a front direction of the electronic device, in response to the display being disposed on a front side of the electronic device.

9. The method as claimed in claim 7, further comprising:
obtaining the image by turning on the camera in response to the content being displayed in a protection mode.

10. The method as claimed in claim 7, further comprising: obtaining the image by turning on the camera in response to a predetermined application being executed and the content being displayed on the application.

11. The method as claimed in claim 7, wherein the UI restricting photographing of the content includes a UI for warning photographing of the content.

12. The method as claimed in claim 7, wherein the displaying comprises displaying the UI for restricting photographing in response to one or more of an object in a shape of a camera, a camera lens or a human trying to perform photographing being detected on the obtained image.

* * * * *